United States Patent [19]

Hulting, Jr.

[11] 4,274,898

[45] Jun. 23, 1981

[54] TIRE BUFFING TOOL AND METHOD

[75] Inventor: Thomas S. Hulting, Jr., East Peoria, Ill.

[73] Assignee: Caterpillar Tractor Co., Peoria, Ill.

[21] Appl. No.: 93,074

[22] PCT Filed: Aug. 30, 1979

[86] PCT No.: PCT/US79/00666

§ 371 Date: Aug. 30, 1979

§ 102(e) Date: Aug. 30, 1979

[87] PCT Pub. No.: WO81/00539

PCT Pub. Date: Mar. 5, 1981

[51] Int. Cl.³ .................................... B29H 21/01
[52] U.S. Cl. ......................... 156/98; 156/97;
156/153; 51/170 R; 51/281 P; 81/15.2
[58] Field of Search ............... 51/170 R, 16 B, 170 T,
51/170 PT, 209 R, 204 R, 206 R, 245, 281, 328,
355, 376–379, 394, 401, 407, 281 P; 156/94, 95,
96, 97, 98, 153; 81/15.2, 15.5, 15.6, 15.7

[56] References Cited

U.S. PATENT DOCUMENTS

| | | | |
|---|---|---|---|
| 671,357 | 4/1901 | Strouse | 81/15.6 |
| 1,210,052 | 12/1916 | Davis | 51/168 UX |
| 2,694,278 | 11/1954 | Anderson | 51/245 |
| 3,105,329 | 10/1963 | Sgorbati | 51/186 |
| 3,656,920 | 4/1972 | Helms | 51/170 PT |
| 3,849,941 | 11/1974 | Barnes | 51/168 |
| 3,869,832 | 3/1975 | Atwater | 51/170 PT |
| 3,996,085 | 12/1976 | Barns et al. | 156/97 |

Primary Examiner—John E. Kittle
Attorney, Agent, or Firm—Phillips, Moore, Weissenberger, Lempio & Majestic

[57] ABSTRACT

This invention relates to a buffing tool (10, 10a) and method for preparing internal surface portions (14) of a tire (13) for application of a sealing patch thereto. A puncture (12) formed in a beadless tire (13), having a tread formed integrally therewith, is difficult to prepare for patching by use of conventional buffing tools and methods due to the mass of tightly wrapped reinforcing wires and multiple plies incorporated in the tire. The pencil-like buffing tool (10, 10a) embodying this invention comprises a shaft (15, 15a), a buffing tip (17, 17a), and a hinge connection (18, 18a) for pivotally mounting the buffing tip (17, 17a) on the shaft (15,15a) for movement between a first, installed position aligning it with the shaft (15, 15a) and a second, operative position, for buffing the internal surface portions of the tire, responsive to rotation of the buffing tool (10, 10a).

14 Claims, 9 Drawing Figures

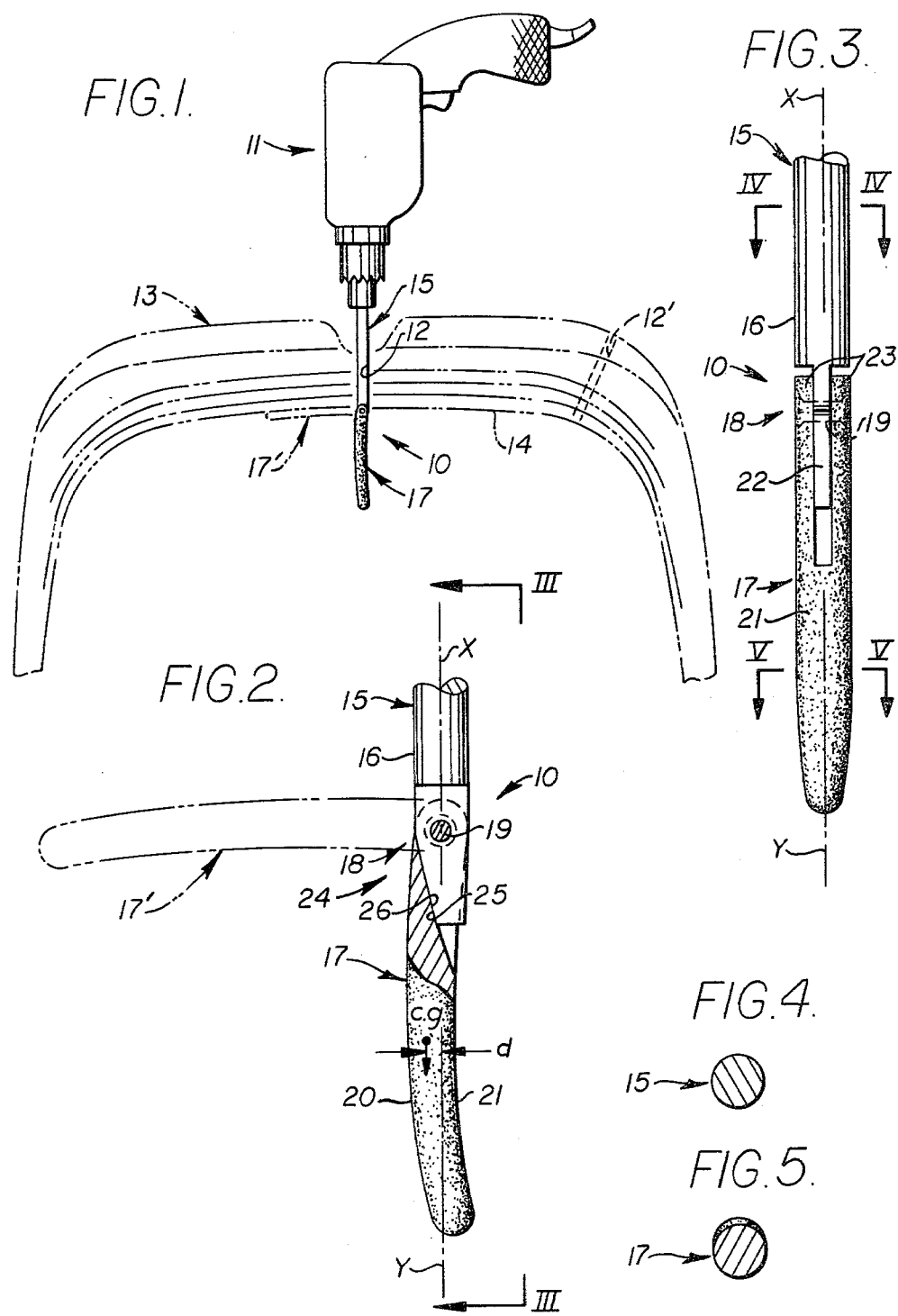

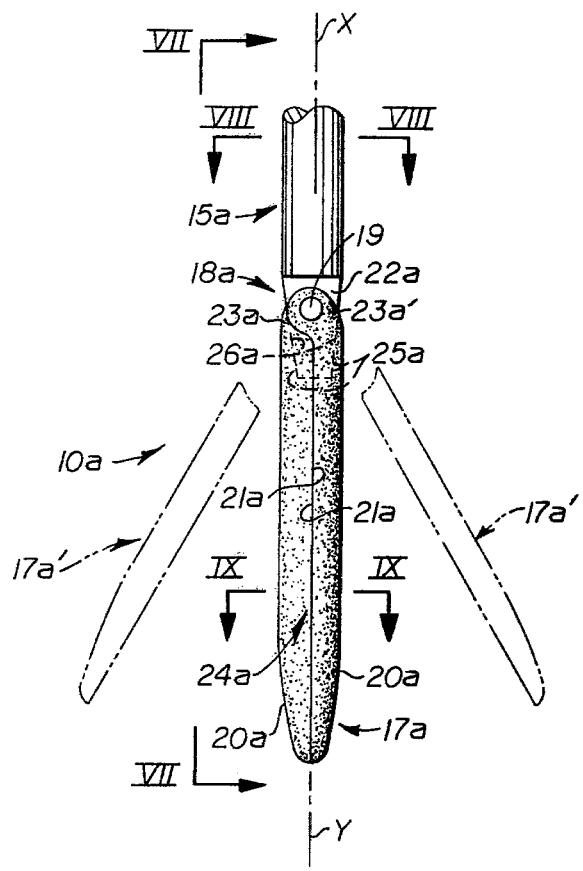
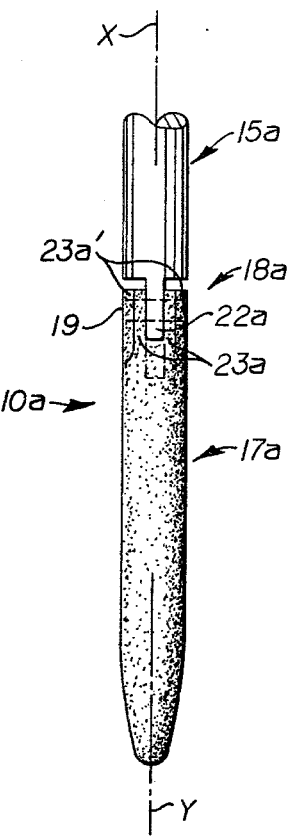
FIG.6.  FIG.7.
FIG.8.  FIG.9.

TIRE BUFFING TOOL AND METHOD

DESCRIPTION

1. Technical Field

This invention relates to a tool and method for buffing internal surface portions of a tire to facilitate application of a sealing patch to a puncture thereof.

2. Background Art

The advent of beadless, i.e., closed torus, tires has given rise to the problem of sealing punctures in such tires. Normally, application of a sealing patch to a standard beadless tire having a removable tread or track belt mounted thereon can be achieved by conventional tools and methods. However, when the tread is formed integrally with the tire, and particularly in respect to smaller-sized beadless tires, tightly wrapped reinforcing wires and multiple reinforcement plies render it difficult to insert a conventional buffing tool within the tire for purposes of buffing internal surface portions thereof, adjacent to the puncture. In particular, a substantially large slit must be formed through the tread and carcass of the tire to accommodate insertion of the rather large buffing tool therethrough.

DISCLOSURE OF THE INVENTION

The present invention is directed to overcoming one or more of the problems as set forth above.

In one aspect of this invention, a buffing tool comprises a shaft and means for mounting a buffing tip on the shaft for movement between a first position wherein the shaft and buffing tip are aligned and the second position disposing the buffing tip in offset and non-linear relationship relative to the shaft.

In another aspect of this invention, a method for buffing an internal surface of a tire comprises the steps of inserting the buffing tool through an aperture formed through the tire, rotating the buffing tool while simultaneously moving the buffer tip thereof transversely relative to the shaft in response to centrifugal force, and moving the buffing tip into engagement with the internal surface of the tire to prepare it for application of a patch thereto.

The buffing tool and method of this invention thus provide for the expeditious and economical preparation of a tire for application of a repair patch thereto. The tool and method, although applicable to beaded as well as beadless tires, are particularly adapted for application to beadless tires having treads formed integrally thereon and wherein the tire is reinforced by tightly wrapped wires and multiple plies.

BRIEF DESCRIPTION OF DRAWINGS

Other objects and advantages of this invention will become apparent from the following description and accompanying drawings wherein:

FIG. 1 illustrates a buffing tool embodiment of the present invention attached to an electric drill and inserted through a puncture formed through a tire for preparing the tire for application of a sealing patch thereto;

FIG. 2 is an enlarged, side elevational view of the buffing tool;

FIG. 3 is a front elevational view of the buffing tool, taken in the direction of arrows III—III in FIG. 2;

FIGS. 4 and 5 are cross sectional views through the buffing tool, taken in the direction of arrows IV—IV and V—V, respectively, in FIG. 3; and FIGS. 6-9 are views similar to FIGS. 2-5, respectively, but illustrating another buffing tool embodiment of the present invention.

BEST MODE OF CARRYING OUT THE INVENTION

FIG. 1 illustrates a pencil-thin tire buffing tool 10 attached to a chuck of a pneumatic tool or an electric drill 11 and inserted through a puncture 12, formed through the tread and carcass of a tire 13. As described more fully hereinafter, rotation of buffing tool 10 by drill 11 and upward pulling thereof by a workman will function to buff and prepare inner surface portions 14 of tire 13 for application of a standard patch to the tire for purposes of sealing puncture 12. Buffing tool 10, although useful in respect to beaded as well as beadless tires, is particularly adapted for application to beadless tires, i.e., closed torus, wherein the tread is formed integrally therewith.

In particular, such tires are reinforced by a plurality of tightly wrapped wires and multiple plies which render it difficult to employ conventional buffing tools having large buffing plates thereon. The problem is further aggravated in respect to smaller-sized tires which require large slits to be formed therethrough to accommodate such conventional buffing tools. The inaccessability of the inner chamber of such a beadless tire also renders it difficult, if not impossible, to utilize other types of conventional buffing tools and methods.

Referring to FIGS. 2-5, buffing tool 10 comprises a shaft or bit 15 adapted to have an upper end thereof suitably secured within a standard chuck of drill 11 (FIG. 1). A lower end 16 of shaft 15 has a single buffing tip 17 pivotally mounted thereon by a hinge connection 18 comprising a pin 19. Hinge connection 18 provides means for mounting buffing tip 17 on shaft 15 for movement between (1) its illustrated first or solid-line position disposing the buffing tip in at least substantial linear relationship relative to shaft 15 to form an extension thereof, and (2) its second or phantom-line position 17' disposing the buffing tip in offset and non-linear relationship relative to the shaft.

This substantial linear relationship, facilitating insertion of buffing tool 10 through a relatively small-diameter puncture 12 in tire 13, is illustrated in FIGS. 2 and 3 wherein a longitudinal axis X of shaft 15 is at least substantially disposed in linear relationship with respect to a longitudinal axis Y of buffing tip 17. Upon rotation of buffing tool 10 by drill 11, centrifugalforce will function to pivot buffing tip 17 to its phantom-line position 17' to dispose axis Y substantially perpendicular relative to axis X of shaft 15. Surface portions of buffing tip 17, particularly on a leading and arcuate side 20 thereof as shown in FIG. 2, are preferably coated with an abrasive material, such as granulated quartz or the like, whereby upward pulling of drill 11 by a workman will engage the leading side of the buffing tip with internal surface portions 14 of tire 13.

The surface portions defining arcuate side 20 are preferably disposed in convex relationship relative to axis Y to at least generally conform to the arcuate shape of the buffed, internal portions 14 of tire 13. In addition and as further shown in FIG. 2, an opposite or trailing side 21 of buffing tip 17 is preferably formed convexly relative to axis Y whereby a center of gravity c.g. is offset at a distance "d" relative to axis Y and the pivot axis of pin 19. This purposeful shifting of the center of gravity of buffing tip 17, although not necessary for effective operation of buffing tool 10, will provide a small moment arm inducing pivoting of buffing tip 17 to its operative 17' position in response to centrifugal force imposed thereon upon rotation of buffing tool 10.

As shown in FIG. 3, hinge connection 18 further comprises a flat extension 22 of shaft 15, disposed between a bifurcated extension 23 of buffing tip 17, to facilitate pivotal mounting of the buffing tip on the shaft by pin 19. As more clearly shown in FIG. 2, extensions 22 and 23 of shaft 15 and buffing tip 17, respectively, define a stop means 24 for holding the buffing tip in its illustrated first position wherein the shaft and buffing tip are at least substantially disposed in linear relationship. In addition, stop means 24 ensures that buffing tip 17 will only pivot clockwise in FIG. 2 to its second, operative position 17' under the influence of centrifugal force.

Stop means 24 preferably comprises pairs of abutting, angled surfaces 25 and 26 formed on shaft 15 and buffing tip 17, respectively. As shown in FIGS. 4 and 5, shaft 15 and buffing tip 17 have cross sectional areas, preferably at least approximately circular, and approximately constant throughout the lengths thereof to facilitate insertion of buffing tool 10 through a relatively small-diameter puncture 12. As discussed above, the buffing portion of conventional buffing tools of this type normally take the form of relatively large circular or rectangular plates requiring a large slit to be formed through the tread and carcass of the tire for insertion of the buffing tool therethrough.

FIGS. 6–9 illustrate another buffing tool embodiment 10a wherein identical numerals depict corresponding constructions, but with numerals depicting modified constructions in FIGS. 6–9 being accompanied by an "a". Buffing tool 10a esentially differs from buffing tool 10 in that the buffing tip comprises a pair of identical buffing tip members 17a pivotally mounted in scissored relationship on a shaft 15a by a hinge connection 18a comprising a common pivot pin 19a pivotally interconnecting overlapped, and bifurcated ends 23a and 23a' of the tip members. It should thus be understood herein that the general term "buffing tip" includes both single buffing tip 17 and pair of buffing tip members 17a.

A stop means 24a, comprising abutting trailing sides 21a of buffing tip members 17a, functions to limit inward pivoting of the buffing tip members to maintain them in their illustrated, collapsed first position (FIG. 6) whereby the composite buffing tip is disposed in at least substantial linear relationship relative to shaft 15a. In addition, stop means 24a ensures that buffing tip members 17a will move outwardly and upwardly in FIG. 6 to their second, phantom-line positions 17a' in response to centrifugal force imposed thereon, upon rotation of shaft 15a.

It should be further noted in FIG. 6 that the center of gravities of buffing tips 17a are preferably offset laterally relative to the pivot axis of pin 19a to induce outward pivoting of buffing tip members 17a in response to centrifugal force imposed thereon. As shown in FIGS. 6 and 7, when buffing tip members 17a are maintained in their non-rotating and collapsed first position, they are disposed in at least substantial linear relationship relative to shaft 15a to facilitate insertion of pencil-thin buffing tool 10a through puncture 12 (FIG. 1) of tire 13. Referring to FIGS. 8 and 9, shaft 15a and buffing tip members 17a have cross sectional areas, preferably at least generally cylindrical, which are at least approximately constant throughout the lengths thereof to facilitate such insertion. Also, the lower ends of buffing tip 17, as well as buffing tip members 17a, are preferably tapered and rounded to further facilitate such insertion into the tire. Leading and trailing sides 20a and 21a, respectively, of buffing tip members 17a may be arcuately shaped, similar to sides 20 and 21 of buffing tip 17, depending upon the particular patching application, as described more fully hereinafter.

INDUSTRIAL APPLICABILITY

Buffing tools 10 and 10a are particularly adapted for preparing a beadless tire 13, having an integrated thread secured thereon, for application of a sealing patch to a puncture 12 thereof. However, it should be understood that the buffing tools, as well as the method herein taught, are equally applicable to the preparation of other types of tires, including beaded ones, by buffing internal surface portions 14 thereof prior to application of a sealing patch thereto.

In preparing tire 13 for application of a standard sealing patch to puncture 12 thereof, a workman need only insert the pencil-thin buffing tool 10, for example, through puncture 12. As discussed above, since buffing tip 17 is disposed in at least substantial linear relationship relative to shaft 15, such insertion may be accomplished expeditiously without having to enlarge puncture 12 for this purpose. Upon actuation of drill 11, buffing tool 10 will rotate (e.g., 3,000 rpm) to simultaneously pivot buffing tip 17 transversely relative to shaft 15 in response to centrifugal force imposed on the buffing tip.

Buffing tip 17 will thus move automatically to its operative position 17', shown in FIGS. 1 and 2, whereby the workman may pull upwardly on drill 11 to move abrasive side 20 of buffer tip 17 into engagement with internal surface portions 14 of tire 13 to buff this area for subsequent application of a standard sealing patch thereto. As discussed above, stop means 24 will ensure only clockwise pivoting of buffer tip 17 in FIG. 2 whereby arcuate side 20 of buffer tip 17 is enabled to precisely buff arcuate surface portions 14 of tire 13. The offset relationship of center of gravity c.g. of buffing tip 17 will aid in inducing pivoting of the buffer tip to its phantom-line position 17' in response to centrifugal force, substantially perpendicular relative to shaft 15. Upon completion of the buffing operation, drill 11 is stopped and buffing tool 10 is pulled through puncture 12 whereafter the patch can be applied thereto in a conventional manner.

Buffing tool 10a will function in a similar manner, as described above. However, a pair of buffing tip members 17a will substantially speed up the time required to complete the buffing operation and will tend to counterbalance the tool during operation thereof.

The shapes and lengths of buffing tips 17 and 17a can be varied within the teachings of this invention to conform them to a wide variety of tire applications, taking into consideration the internal shape of the tires, the radial thickness of the tire's tread and the carcass, the sizes of the punctures to be patched, and the like. For example, for small-diameter punctures 12 a relatively short buffing tip 17 or 17a will suffice. When a puncture 12' occurs adjacent to a sidewall of the tire it will be made obvious to those skilled in the arts relating hereto that buffing tips 17 and 17a will require more pronounced curvatures than that shown in FIGS. 2 and 6 to accommodate the more pronounced curvature on the internal surface portions of the tire.

Other aspects, objects and advantages of this invention can be obtained from a study of the drawings, the disclosure, and the appended claims.

What is claimed is:

1. A buffing tool (10,10a) comprising
   a shaft (15,15a),
   a buffing tip (17,17a), and
   means (18,18a) for mounting said buffing tip on said shaft (15,15a) for movement between a first position disposing said buffing tip (17,17a) in at least substantial linear relationship relative to said shaft (15,15a) to form an extension thereof, and a second position disposing said buffing tip (17,17a) in offset and non-linear relationship relative to said shaft (15,15a) in response to rotation of said buffing tool (10a) and centrifugal force imposed on said buffing tip (17,17a).

2. The buffing tool (10,10a) of claim 1 wherein cross sectional areas of each of said shaft (15,15a) and said buffing tip (17,17a) are at least approximately constant throughout the lengths thereof.

3. The buffing tool (10,10a) of claim 2 wherein said cross sectional areas are at least approximately circular.

4. The buffing tool of claim 1 wherein said means (18,18a) includes pivot means (19,19a) for pivotally connecting an upper end of said buffing tip (17,17a) to a lower end of said shaft (15,15a).

5. The buffing tool (10,10a) of claim 4 wherein at least one leading side (20,20a) of said buffing tip (17,17a), when said buffing tip (17,17a) moves from its first to its second position, is arcuate and convex relative to a longitudinal axis (Y) of said buffing tip (17,17a).

6. The buffing tool (10,10a) of claim 5 wherein at least one trailing side (21,21a) of said buffing tip (17,17a), opposite to the leading side (20,20a) thereof, is arcuate and concave relative to the longitudinal axis (Y) of said buffing tip.

7. The buffing tool (10,10a) of claim 4 wherein a center of gravity (c.g.) of said buffing tip (17,17a), when said buffing tip (17,17a) is disposed in its first position, is offset laterally (d) relative to a pivot axis of said pivot means (19,19a).

8. The buffing tool (10,10a) of claim 1 further including stop means (24,24a) for holding said buffing tip (17,17a) in its first position and for inducing movement of said buffing tip (17,17a) in only one direction relative to said shaft (15,15a) upon rotation of said buffing tool (10,10a) and in response to centrifugal force imposed on said buffing tip (17,17a).

9. The buffing tool (10,10a) of claim 8 wherein said stop means (24,24a) includes abutting surfaces (25,26,25a,26a) defined on said shaft (15,15a) and on said buffing tip (17,17a).

10. The buffing tool (10) of claim 1 wherein said buffing tip (17) constitutes a single member and wherein said means (18) include pivot means (19) for pivotally mounting said buffing tip (17) on said shaft (15) and for permitting pivotal movement of said buffing tip (17) on said shaft (15) in response to rotation of said buffing tool (10) and centrifugal force imposed on said buffing tip (17).

11. The buffing tool (10a) of claim 1 wherein said buffing tip (17a) includes a pair of members and wherein said means (18a) includes pivot means (19a) for pivotally mounting said members in scissored relationship on said shaft (15a) for outward movement towards said second position in response to rotation of said buffing tool (10a) and centrifugal force imposed on said members.

12. A method for buffing an internal surface (14) of a tire (13) comprising the steps of
    inserting an elongated, pencil-like buffing tool (10,10a), having a shaft (15,15a) and a buffing tip (17,17a) pivotally connected thereon to form an aligned extension thereof, through an aperture (12) formed through said tire (13),
    rotating said buffing tool (10,10a) while simultaneously moving the buffer tip (17,17a) thereof transversely relative to said shaft (15,15a) in response to centrifugal force imposed thereon, and
    moving said buffer tip (17,17a) into buffing engagement with the internal surface (14) of said tire (13).

13. The method of claim 12 further comprising the step of shaping a leading side (20,20a) of said buffing tip (17,17a), engageable with the internal surface (14) of said tire (13) during said moving step, to at least approximately conform it to the internal surface (14) of said tire (13).

14. A buffing tool (10,10a) comprising
    a shaft (15,15a),
    a buffing tip (17,17a), cross sectional areas of each of said shaft (15,15a) and said buffing tip (17,17a) being at least approximately constant throughout the lengths thereof, and
    means (18,18a) for mounting said buffing tip on said shaft (15,15a) for movement between a first position disposing said buffing tip (17,17a) in at least substantial linear relationship relative to said shaft (15,15a) to form an extension thereof, and a second position disposing said buffing tip (17,17a) in offset and non-linear relationship relative to said shaft (15,15a).

* * * * *